United States Patent [19]
Zemien

[11] 3,786,950
[45] Jan. 22, 1974

[54] APPARATUS FOR LOADING SNOWMOBILES ON TRAILERS

[76] Inventor: Andrew S. Zemien, 6311 Jefferson St., Fridley, Minn.

[22] Filed: Dec. 29, 1972

[21] Appl. No.: 319,519

[52] U.S. Cl. .................................. 214/506, 188/32
[51] Int. Cl. ............................................. B60p 3/00
[58] Field of Search ......... 214/505, 506, 84; 188/32

[56] References Cited
UNITED STATES PATENTS
3,672,523    6/1972    Albert................................. 214/506
FOREIGN PATENTS OR APPLICATIONS
310,185    4/1929    Great Britain......................... 188/32

Primary Examiner—Albert J. Makay

[57] ABSTRACT

An attachment for facilitating the loading of a snowmobile on a tilting type trailer is described. The attachment, in its simplest form, comprising a pair of ramp-like members, each ramp terminating in a sheer dropoff, and having one side defining a guide and adapted to be removably-secured to the trailer bed. As the snowmobile is driven onto the trailer, its skis engage the guide attachment and are steered up the ramps until the trailing edges of the skis fall off the sheer dropoff back onto the trailer bed, thus giving a positive indication that the snowmobile is in a desired position on the trailer bed. The sheer dropoff of the ramps also provide a restraining surface in holding the snowmobile in a desired location on the trailer and prevent it from sliding back down the trailer's inclined bed.

4 Claims, 8 Drawing Figures

3,786,950

APPARATUS FOR LOADING SNOWMOBILES ON TRAILERS

BACKGROUND OF THE INVENTION

It has been the practice in the transportation of snowmobiles to carry them on articulated trailers. These trailers usually have a single pair of wheels and are located by lowering the rear of the trailer about an articulated pivot point. This can be accomplished while the trailer is still attached to the towing vehicle. With the rear of the trailer lowered to the ground, it is possible to drive a snowmobile up onto the ramp formed by the trailer itself, using the snowmobiles own power This is a difficult maneuver because quite often the trailer is covered with ice and snow, making steering of the snowmobile difficult. It is vital to prevent the snowmobile from slipping off the side of the trailer. This becomes particularly critical when a single trailer is used to transport more than one snowmobile. A second requirement is the ability to stop the snowmobile at the correct spot. This often requires a high degree of skill on the part of the operator. If the snowmobile is stopped too far to the rear of the trailer, it is difficult if not impossible, to raise the rear of the trailer to a horizontal position for transport because of the heavy weight of the snowmobile. If the snowmobile is driven too far forward its heavy weight can counterbalance the lowered rear portion of the trailer, which will restore the trailer to a horizontal position, and permit the snowmobile to continue off the front of the trailer onto the rear of the towing vehicle. This can cause considerable damage and be difficult to rectify in that it is extremely awkward to reposition the snowmobile onto the trailer from such a location.

The present invention provides a simple, removable attachment, having no moving parts, which can readily be mounted upon any trailer to overcome the limitations of the present systems. This attachment guides the snowmobile and also provides a positive stop position which holds the snowmobile in both the correct left-right and fore-aft positions on the trailer. This not only permits a person with a low level of skill to load a snowmobile, but also eliminates a potential source of accidents. When the snowmobile is located in the proper position fore and aft by the present invention, the operator can readily raise the trailer to a horizontal position. The proper fore-aft position is one where there is still more of the weight of the snowmobile on the rear of the trailer than forward, but there is not enough weight on the rear as to require an excessive force on the part of the average operator to level the trailer. Thus, this invention permits a relatively unskilled operator to safely load and spot a snowmobile in its proper position both left-right and fore-aft on a trailer.

SUMMARY OF THE INVENTION

This invention relates generally to a transporting system for snowmobiles and particularly to an attachment for a trailer which guides a snowmobile to its proper location in both the fore-aft and left-right positions with respect to the bed of a trailer.

It is accordingly a general object of the present invention to provide a new and improved snowmobile trailer loading system.

It is a more particular object of the present invention to provide a new and improved means for loading a snowmobile to a preselected precise fore-aft and left-right position upon a trailer and to eliminate the hazards to the operator or to the equipment when driving a snowmobile onto a trailer.

It is another object of the present invention to provide this new and improved loading system using an attachment which is extremely simple in design, is easy to attach and remove, which has no moving parts and which is accordingly economical and easy to manufacture with a long and safe operational life.

DETAILED DESCRIPTION OF THE PREFERRED EMBODIMENT

Figure 1:
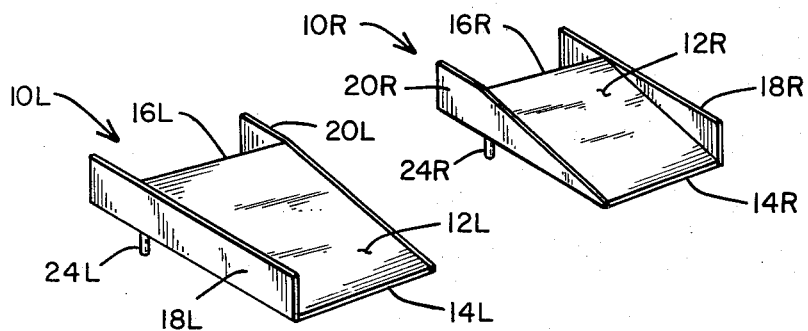
FIG. 1 is a perspective view of the two attachments, one for each ski of the snowmobile.

Referring in detail to FIG. 1, the structure of the snowmobile loading guide and stop attachment can be seen. There are two such attachments 10L and 10R, each being a mirror image of the other. The one which engages the left ski of the snowmobile is on the left side of the view in FIG. 1 and all reference numbers relating thereto use the suffix L. In like manner, the attachment which engages the right ski of the snowmobile is on the right side of the view in FIG. 1 and all reference numbers thereto use the suffix R.

The top surfaces 12L and 12R are inclined planes which have a positive gradient in the upward direction from edge 14L and 14R to edge 16L and 16R respectively. Planes 18L and 18R are perpendicular to planes 12L and 12R respectively and project above the surface of planes 12L and 12R respectively. Planes 20L and 20R are perpendicular to planes 12L and 12R but do not project up above the surface of planes 12L and 12R respectively.

Figure 2:
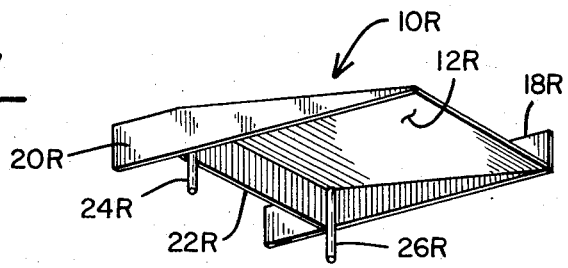
FIG. 2 is a bottom perspective view of the right attachment.

Referring to FIG. 2, the understructure of the loading guide and stop attachment can be seen. A vertically disposed plane 22R is perpendicular to planes 20R and 18R and terminates at the top of inclined plane 12R. There are two pins 24R and 26R. Pin 24R is secured adjacent to the intersection of plane 20R and 22R and terminates at plane 12R on one end, but extends beyond planes 20R and 22R on the opposite end. Pin 26R is secured to the intersection of plane 18R and 22R and also terminates at plane 12R on one end and extends beyond planes 18R and 22R on the other end. There are corresponding pins on the left attachment pin 24L corresponding to pin 24R and pin 26L corresponding to pin 26R. Note in FIG. 2 that planes 18R and 20R extend beyond plane 22R in a horizontal direction, but do not extend above it, and that the inclined plane 12R terminates at plane 22R. Planes 18L and 20L are similarly constructed.

While only the underview of the right attachment is shown in FIG. 2, all the parts and arrangements have a mirror image counterpart in the left attachment as illustrated in the view of FIG. 1. All of the planes and the pins are rigidly attached together as illustrated in FIG. 1 and FIG. 2, by welding or other suitable means, and have no relative movement of one part with respect to the other in the operation of this device.

Figure 3:
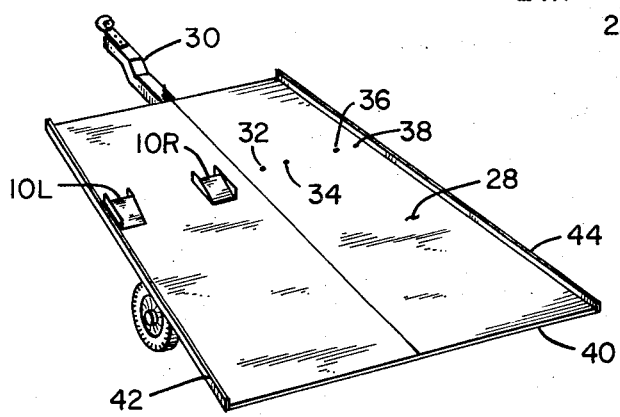
FIG. 3 is a top plan view of an inclined trailer bed with the two attachments in place and with provision for a second pair of attachments.

FIG. 3 shows the attachments 10L and 10R mounted in place on the bed of the trailer 28. As shown in this position, the loading guide and stop attachments 10L and 10R are located to position a snowmobile being loaded on the left half of the trailer bed 28. All references to the trailer consider the front as being the part nearest to the trailer hitch 30 and left and right to be the relative positions to a viewer facing forward. Holes 32, 34, 36 and 38 in the trailer bed 28 provide the means for removably securing the attachments to the trailer prior to the loading of a snowmobile on the right half of the trailer bed. Holes 32 and 34 receive pins 24L and 26L of attachment 10L and holes 36 and 38 receive pins 24R and 26R of attachment 10R respectively. A corresponding set of four holes on the left half of the trailer bed 28 provide a receptacle for the pins 24L, 26L, 24R and 26R with 10L and 10R on the left side of the trailer as shown.

Holes 32, 34, 36, and 38 provide a twofold function. They prevent the attachments 10L and 10R from sliding with respect to the trailer bed 28 and in addition they orient the attachments 10L and 10R such that their rear edges 14L and 14R are parallel with respect to the rear edge of the trailer bed 40 and the sides 18L, 20L, 18R and 20R are parallel to the sides of the trailer bed 42 and 44. The inclined planes 12L and 12R are thus inclined with respect to the trailer bed 28 such that there is a positive gradient in an upward direction from the rear of the trailer forward. Thus, holes 32, 34, 36, and 38 in conjunction with pins 24L, 26L, 24R and 26R are a simple yet effective way to so secure the attachments and yet provide for ease in removal to permit the use of the same said attachments on the other half of the trailer or to permit their complete removal after the completion of the snowmobile loading operation.

Figure 4:
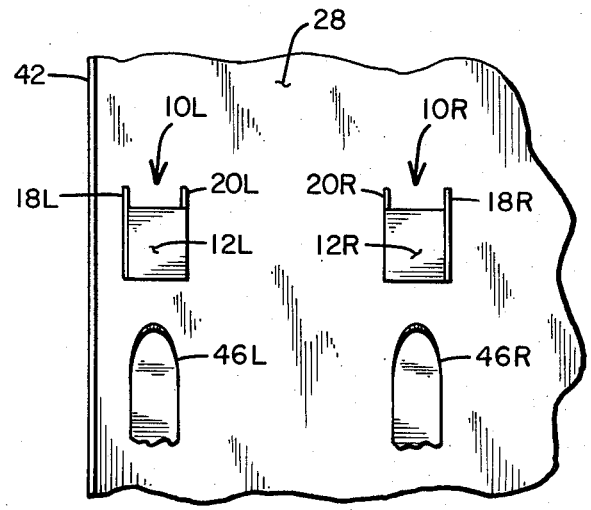
FIG. 4 is a top view of the bed of a trailer with the two attachments in place and with a pair of snowmobile skis in a position immediately before engagement.

FIG. 4 shows the top view of the attachments 10L and 10R in place on a trailer bed 28 with the left ski 46L and the right ski 46R of a snowmobile about to engage the attachments. The purposes of the guides 18L and 18R, which project up above the inclined planes 12L and 12R respectively, can now be ascertained. In the use of the attachments, the bed of the trailer 28 is inclined as shown in FIG. 3 and the snowmobile is driven by the operator up the ramp formed by the trailer itself on the side of the trailer having the attachments 10L and 10R mounted. If the snowmobile is steered too far to the left, then ski 46L will strike the vertical projection plane 18L, which will force the said ski to the right. If the snowmobile is steered too far to the right, then ski 46R will strike the vertical projection plane 18R, which will force the said ski to the left. This simple, passive deflection system will keep the skis in their proper left-right relationship between the attachments 10L and 10R, which are so located as to result in the snowmobile itself being positioned in the proper left-right relationship with respect to the trailer bed 28.

The vertical planes 20L and 20R do not project above the inclined planes 12L and 12R. This permits the skis 46L and 46R to be initially skewed with respect to the said attachments but still not have any interference with the operation. If vertical planes 20L and 20R did project above the inclined planes 12L and 12R, then only a small misalignment or displacement would result in the ski being jammed between the two vertical planes.

Figure 6:
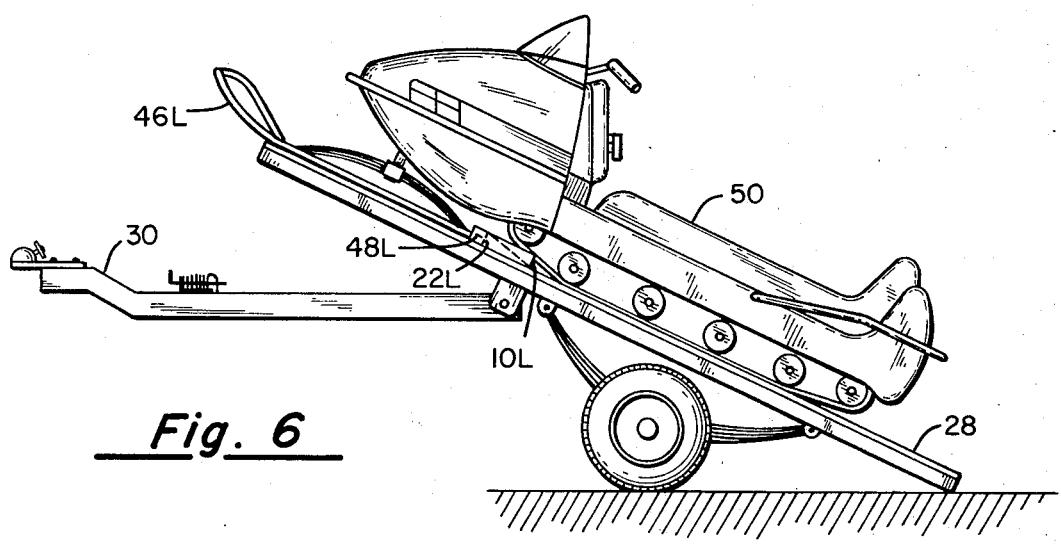
FIG. 6 is a side view of a snowmobile loaded in place on an inclined trailer.
Figure 5A:
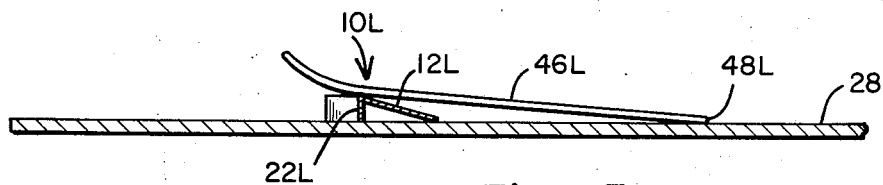
FIG. 5a, 5b, and 5c are three side elevational views of a snowmobile ski shown during the process of being positioned by the attachment.
Figure 5B:
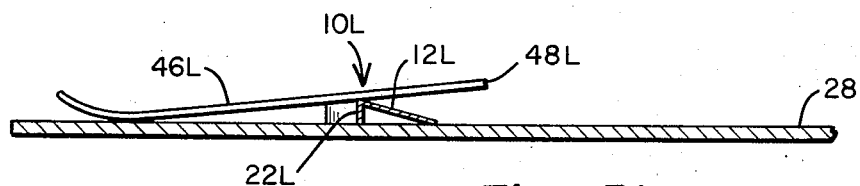
Figure 5C:
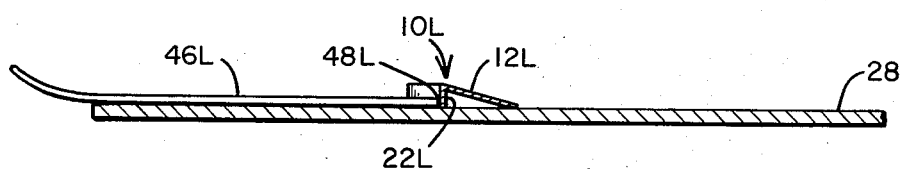

This steering action not only positions the snowmobile with respect to the trailer bed 28, but directs the said skis onto the inclined planes 12L and 12R. Referring to FIGS. 5a, 5b, and 5c, there is shown the entire sequence of a ski passing over an inclined plane. In the figures, the left ski is shown but the right ski is going through the same sequence at the same time. The left ski 46L is directed onto the attachment 10L and rides up onto the inclined plane 12L, as shown in FIG. 5a. In FIG. 5b, the ski 46L has almost passed over the inclined plane 12L. In FIG. 5c, the ski 46L has passed completely over the inclined plane 12L and the rear of the ski 48L has dropped down to the trailer bed 28. This sequence of events is a clue to the operator that the snowmobile 50 is in the correct position as shown in FIG. 6. When the operator observes that ski ends 48L and 48R have dropped off of the ramp, defined by planes 22L and 22R respectively, he knows that he should shut off the power to the snowmobile. It should be noted that the operator has the option of operating the snowmobile while standing to the side of the trailer or while riding on the snowmobile in the normal operating position. This option permits him to select the best operating position based upon the snowmobile size and weight and conditions as to snow and ice upon the trailer.

FIG. 6 shows how the trailer bed 28 is inclined. When the snowmobile's power is shut off, it will stop its forward motion and slide to the rear down the inclined plane formed by the trailer bed 28 until the rear edge of the skis 48L and 48R abuttes the vertical planes 22L and 22R of the attachments. The forward projecting sides of the loading attachments provide horizontal restraint for the rear portion of the skis and prevents lateral displacement thus keeping the rear of the skis against the vertical planes of the attachments. The snowmobile 50 will be arrested by these vertical planes and will be maintained in the desired fore and aft position on the trailer bed 28. Here again the operation of the present invention is simple, yet positive, and does not require the use of any moving parts in its function. The width of the attachments inclined planes 12L and 12R are approximately twice the width of the skis which also assists in this action.

The snowmobile 50 can now be secured in its proper position and the attachments 10L and 10R removed for use on the other side of the trailer or on another trailer.

While the preferred embodiment of the invention has been described, various modifications will become apparent to those skilled in the art. For example, any number of equivalent fastening means could have been used to secure the attachments to the trailer bed. Accordingly, the scope of the invention is to be determined by the appended claims.

What is claimed is:

1. An improved attachment for use with a tiltable bed trailer for facilitating the loading and securing of a snowmobile of the steerable ski member type, the improvement comprising:
a. a wedge shaped member having an inclined plane terminating at an abrupt front edge and first and second sides;
b. a rectangular side plate affixed to said first side of said wedge shaped member, said side plate having a height dimension at least as great as the height of said front edge and a length dimension exceeding the length of said inclined plane by a predetermined amount whereby when the ski member of said snowmobile has traversed the attachment the rear end of said ski member abuts the front edge of said attachment preventing rearward motion of the snowmobile in the tilted position of the trailer; and
c. means for removably affixing said wedge shaped member on the bed of said trailer.

2. The attachment as in claim 1 and further including a second side plate member affixed to said second side, the height thereof being tapered at the same angle as the angle of incline and having a length dimension exceeding the length of said inclined plane by said predetermined amount.

3. Apparatus as in claim 1, wherein said last mentioned means comprises a pair of vertical projections extending downward from the base of said wedge shaped member from locations next to the intersection of said first and second side plates and said front edge, said projections being adapted to fit into mating apertures in said bed of said trailer.

4. Apparatus as in claim 2 wherein the spacing between said first and second side plate members is approximately twice the width of a snowmobile ski.

* * * * *